April 7, 1936.  A. VALÁŠEK ET AL  2,036,448
PISTON
Filed April 6, 1934  2 Sheets-Sheet 1

Adolf Valášek
& Emanuel Valenta
INVENTORS

BY
ATTORNEY

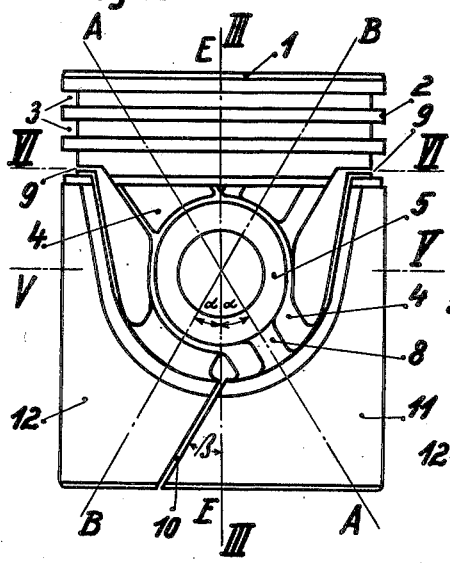
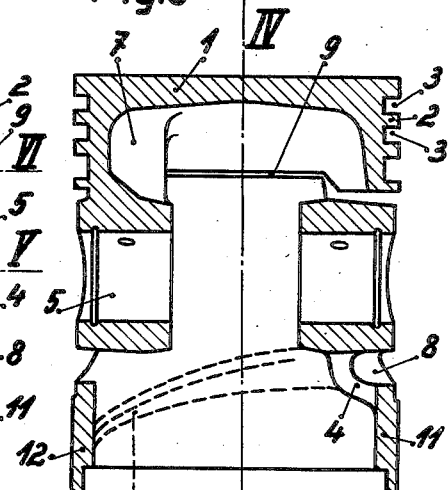
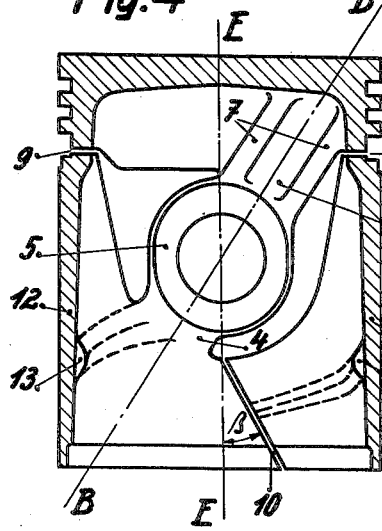
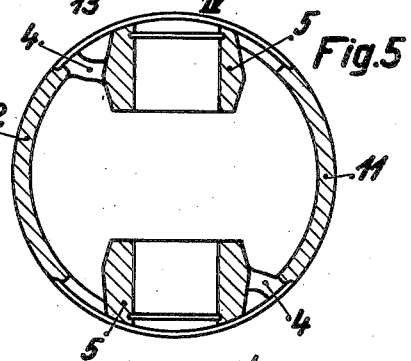
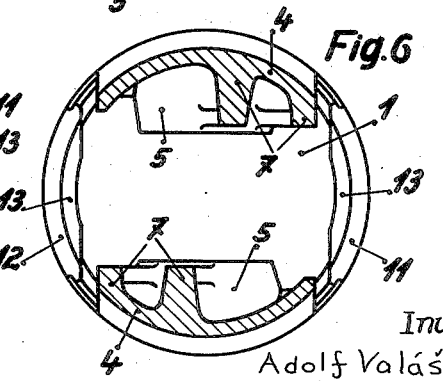

Patented Apr. 7, 1936

2,036,448

UNITED STATES PATENT OFFICE 2,036,448

PISTON

Adolf Valášek and Emanuel Valenta, Pilsen, Czechoslovakia, assignors to Limited Company formerly the Skoda Works, Pilsen, Prague, Czechoslovakia, a corporation of Czechoslovakia Application April 6, 1934, Serial No. 719,237
In Czechoslovakia April 19, 1933

4 Claims. (Cl. 309—11)

This invention relates to a piston, the head and skirt of which are connected together by connecting elements carrying the gudgeon pin bearings. In the pistons of this type which are already known, stiffening means are provided in addition to the connecting elements, the said stiffening means being made of a material of smaller coefficient of expansion than that of the connecting elements or piston. Such pistons suffer from various disadvantages. They constitute a rigid system, in which the unusually large expansion of certain parts of the piston, particularly the skirt, the said large expansion being due to the high coefficient of expansion of the material of which the piston is made (light metal alloys), is compensated by the stiffening means in a manner which, in addition to being complicated, is also insufficient. A further disadvantage of the known pistons of this kind is their complicated construction.

The object of this invention is to provide a piston of the kind referred to hereinbefore, which piston possesses great strength, is of simple construction, being capable of manufactures by casting, and whose skirt in addition has a resilient effect to such a considerable extent that the skirt can follow every expansion due to the material of which the piston is made. According to the invention, this is accomplished by the fact that the piston skirt is composed of two parts, which are disposed in overhung manner on the connecting elements carrying the gudgeon pin bearings such that each connecting element is connected with one of the parts of the piston skirt.

A constructional example of the piston according to the invention is shown in the accompanying drawings, in which:

Figure 2 shows another embodiment of the piston in side elevation.

Figure 3 shows a section along the line III—III in Figure 2.

Figure 4 is a section along the line IV—IV in Figure 3.

Figures 5 and 6 are cross-sections along the lines V—V and VI—VI, respectively, in Figure 2.

Figures 1, 1A:
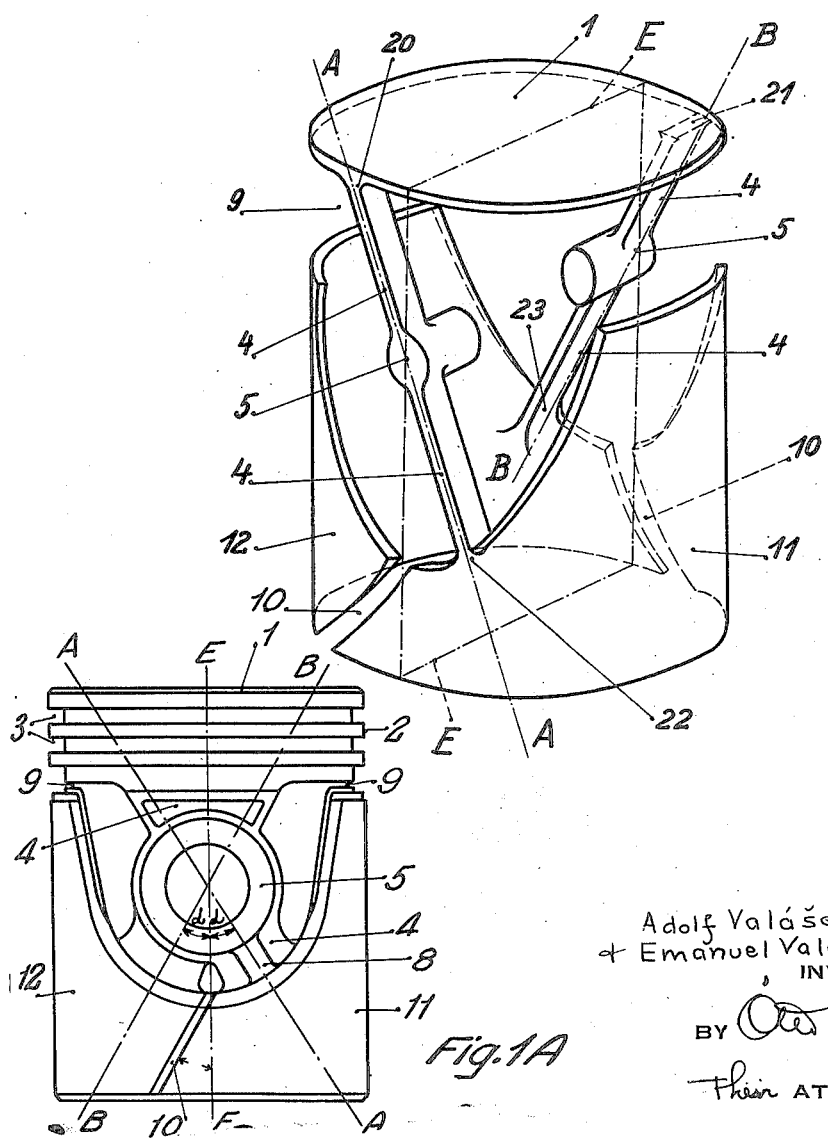
Figure 1 shows diagrammatically in perspective the principle on which the piston is based.
Figure 1a shows one embodiment in side elevation.

I is the piston head which is provided in its cylindrical part 2 with grooves 3 for the piston rings. The piston head I is connected to the skirt of the piston by elements 4 carrying the bearings 5 for the gudgeon pin.

The piston skirt is composed of two parts 11, 12, which are disposed in overhung manner on the connecting elements 4 carrying the gudgeon pin bearings 5, such that each connecting element is connected to one of the skirt parts 11, or 12, respectively. The gaps extending between the piston head 1 and the skirt parts 11, 12 are shown at 9, and the separating slits extending between the skirt parts 11, 12 are shown at 10.

In the constructional example shown in the drawings, the connecting elements 4 consists of two stays disposed cross-wise with respect to each other, and so arranged with respect to the piston axial plane E—E passing through the gudgeon pin bearings 5 that the points of attachment 20, 21 of the stays 4 on the piston head 1, and the points of attachment 22, 23 of the stays 4 on the skirt parts 11, 12 lie on different sides of the piston axial plane E—E. In addition, the points of attachment 20 to 23 are disposed in alternate arrangement, that is to say, the points 20, 22 of the stay 4 corresponding to one skirt part 11, and the points 21, 23 of the stay 4 corresponding to the other skirt part 12 are on different sides of the piston axial plane E—E. The axes A—A and B—B of the stays 4 seen in the axial direction of the gudgeon pin cross each other in the axis of the gudgeon pin and each make an angle $a$ with the piston axial plane E—E. The angle at which the two axes A—A and B—B of the stays cross each other is therefore $2a$.

Those parts of the stays which are situated between the gudgeon pin bearings 5 and the piston head 1 may be constructed in a manner different from that described in the foregoing. For example, the said stay parts may lie in the piston axial plane E—E. Those parts of the stays 4 which are situated below the gudgeon pin bearings 5 are in this case divergent with respect to each other, such that the points of attachment 22, 23 of the stays 4 on the skirt parts 11, 12 lie on different sides of the piston axial plane E—E passing through the gudgeon pin bearings 5. This is shown in Fig. 1a.

The separating slits 10 which subdivide the piston skirt into its parts are disposed below the gudgeon pin bearings 5. The separating slits 10 may be either parallel to the piston axial plane E—E or inclined at an angle thereto. In the constructional example shown in the drawings, the separating slits are inclined at an angle α to the piston axial plane E—E, and in different directions with respect to the plane E—E, as are also the stays 4 situated near the separating slits.

In order to provide connecting stays 4 of rigid construction and yet of light weight, the said connecting stays are stiffened by stiffening means, in the present constructional example, by stiffening ribs 7, 8. The stiffening ribs 7 for that part of the stays 4 which is situated above the gudgeon pin bearings 5 engage the piston head 1 deeply and are arranged in pairs in order to provide a particularly robust connection of the gudgeon pin bearings 5 with the piston head. The stiffening ribs 8 extend in the middle of the lower part of the stay 4.

In order to influence the degree of resiliency of the skirt parts 11, 12 in accordance with the requirements which the piston has to satisfy, suitable means may be provided for stiffening the skirt parts. A possible means for such stiffening of the skirt parts 11, 12 is to provide ribs 13 starting from the lower ends of the stays 4 and extending over the periphery of the piston skirt or parts thereof. The ribs 13 may be either horizontal or in spiral form starting from the stays 4 and extending towards the lower edge of the piston skirt. Tests have shown that more particularly the stiffening of the skirt parts by the spiral ribs affords special advantages in regard to the resiliency of the piston skirt, and in addition reliably eliminates the danger of fatigue of the material.

The piston described in the foregoing satisfies all requirements which the operation of internal combustion engines demands of a satisfactory piston construction. The heat of the piston head is conducted by a sufficiently large cross-section of the stays 4 through the gudgeon pin bearings 5 to the lower portions of the skirt halves, and only from thence does the heat reach the upper portions of the skirt halves. On this long path, the flow of heat is diminished by the cooling effect of the oil flowing round the stays and gudgeon pin bearings and a good escape of heat through the cylinder walls is also ensured. An approximately uniform and low heating of the piston skirt, and consequently a comparatively small expansion over the entire height of the piston is also secured thereby. Due to the overhung attachment of the skirt parts 11, 12 to the connecting elements 4, in combination with the cross-wise arrangement of the connecting elements, the rigid parts of the piston skirt are located in the vicinity of the piston axial plane E—E, that is to say, they are removed as far as possible from the place where there is the greatest danger of seizing. In this way, the danger of seizing and the danger of material fractures are eliminated, since the piston is not stressed mechanically at all at the places where there is a tendency to seize. Due to the fact that the most resilient places of the skirt are diametrically opposite the stiff places, there results, apart from good resiliency, also a rational distribution of the degree of resiliency over the entire periphery of the skirt, and displacement or twisting of the gudgeon pin out of its central position is most effectively prevented.

A further advantage of the present piston is that it only possesses a few parts, and consequently only a few transition places, which may easily be so constructed as to eliminate the danger of fatigue or fracture at such places, particularly at the points of attachment of the connecting stays 4 on the skirt parts.

We claim:—

1. A piston comprising a head portion, two skirt portions, connecting elements between the head portion and each skirt portion, gudgeon pin bearings in said connecting elements, and ribs extending spirally round the inner surface of the skirt portions from the junctions of the connecting elements with said portions.

2. A piston comprising a head portion, two skirt portions separated from each other by slits, a single connecting strut between the head portion and each skirt portion, gudgeon pin bosses in said connecting struts located above the slits and intermediate the ends of said struts, the junction between said struts and their respective skirt portions being located only on one side of the slits between the skirt portions, and the junction of one strut lying on one side of a plane containing the piston axis and the pin boss axis, and the junction between the other strut and its skirt portion lying on the other side of said plane, so that the strut parts situated between the gudgeon pin bosses and the skirt portions cross one another when viewed in the direction of the gudgeon pin axis.

3. A piston according to claim 2, and in which the junction between the connecting struts and their associated head and skirt portions are on alternate sides of the plane containing the piston and gudgeon pin boss axes, so that the struts in their whole length cross one another when viewed in the direction of the gudgeon pin axis.

4. A piston according to claim 2, and in which the slits between the skirt portions and the struts are inclined in opposite directions with respect to the axial plane of the piston containing the gudgeon pin bosses.

ADOLF VALÁŠEK.
EMANUEL VALENTA.